United States Patent
Amid et al.

(10) Patent No.: US 10,553,202 B2
(45) Date of Patent: *Feb. 4, 2020

(54) METHOD, APPARATUS, AND SYSTEM FOR CONFLICT DETECTION AND RESOLUTION FOR COMPETING INTENT CLASSIFIERS IN MODULAR CONVERSATION SYSTEM

(71) Applicant: International Business Machines Corporation, Armonk, NY (US)

(72) Inventors: David Amid, Haifa (IL); David Boaz, Haifa (IL); Tin Kam Ho, Millburn, NJ (US); Amir Kantor, Haifa (IL); Luis A. Lastras-Montano, Cortlandt Manor, NY (US); Neil R. Mallinar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,161

(22) Filed: Oct. 31, 2017

(65) Prior Publication Data

US 2018/0358001 A1    Dec. 13, 2018

Related U.S. Application Data

(63) Continuation of application No. 15/620,240, filed on Jun. 12, 2017.

(51) Int. Cl.
*G10L 15/06* (2013.01)
*G10L 15/18* (2013.01)
(Continued)

(52) U.S. Cl.
CPC ........ *G10L 15/063* (2013.01); *G06F 16/3329* (2019.01); *G06N 20/00* (2019.01);
(Continued)

(58) Field of Classification Search
CPC ... G06F 17/27; G06F 17/2785; G10L 15/063; G10L 2015/633; G10L 15/01;
(Continued)

(56) References Cited

U.S. PATENT DOCUMENTS 9,082,403 B2    7/2015    Ju et al.
9,477,643 B2    10/2016   Barve et al.
(Continued)

OTHER PUBLICATIONS

Baraldi, et al. "Quality assessment of classification and cluster maps without ground truth knowledge." IEEE Transactions on Geoscience and Remote Sensing 43.4, Apr. 2005, pp. 857-873.*
(Continued)

*Primary Examiner* — James S Wozniak
(74) *Attorney, Agent, or Firm* — Terrile, Cannatti & Chambers, LLP; Stephen A. Terrile

(57) ABSTRACT

A method, apparatus, and system are provided for resolving conflicts between training data conflicts by retrieving independent training data sets, each comprising a plurality of intents and end-user utterances for use in training one or more classifiers to recognize a corresponding intent from one or more of the end-user utterances, providing a first test end-user utterance associated with a first intent from the first independent training data set to the one or more classifiers to select an output intent generated by the one or more classifiers; identifying a first conflict when the first intent does not match the output intent, and automatically generating, by the system, one or more conflict resolution recommendations for display and selection by an end user to resolve the first conflict.

9 Claims, 5 Drawing Sheets

(51) Int. Cl.
*G06N 20/00* (2019.01)
*G06F 16/35* (2019.01)
*G10L 15/01* (2013.01)
*G06F 17/27* (2006.01)
*G06F 16/332* (2019.01)

(52) U.S. Cl.
CPC ...... *G10L 15/1815* (2013.01); *G06F 17/2785* (2013.01); *G10L 15/01* (2013.01); *G10L 2015/0638* (2013.01)

(58) Field of Classification Search
CPC .... G10L 2015/0633; G10L 2015/0638; G06N 99/005; G06N 20/00
USPC ..... 704/9, 243–244, 257; 706/46–47, 55, 25
See application file for complete search history.

(56) References Cited

U.S. PATENT DOCUMENTS

| | | | | |
|---|---|---|---|---|
| 9,589,564 | B2* | 3/2017 | Sharifi | G10L 15/26 |
| 9,640,176 | B2* | 5/2017 | Tur | G10L 15/065 |
| 2006/0034434 | A1* | 2/2006 | Kashi | G06F 9/543 |
| | | | | 379/93.07 |
| 2006/0047617 | A1* | 3/2006 | Bacioiu | G06K 9/6262 |
| | | | | 706/59 |
| 2006/0212293 | A1* | 9/2006 | Tur | G10L 15/065 |
| | | | | 704/244 |
| 2006/0224538 | A1* | 10/2006 | Forman | G06N 20/00 |
| | | | | 706/20 |
| 2006/0235687 | A1* | 10/2006 | Carus | G10L 15/063 |
| | | | | 704/252 |
| 2007/0168849 | A1* | 7/2007 | Bell | G06F 11/3604 |
| | | | | 714/799 |
| 2011/0307252 | A1* | 12/2011 | Ju | G10L 15/1822 |
| | | | | 704/232 |
| 2012/0089394 | A1* | 4/2012 | Teodosiu | G06F 17/2785 |
| | | | | 704/235 |
| 2012/0150531 | A1* | 6/2012 | Bangalore | G06F 17/28 |
| | | | | 704/9 |
| 2013/0132331 | A1* | 5/2013 | Kowalczyk | G06N 20/00 |
| | | | | 706/52 |
| 2015/0019204 | A1* | 1/2015 | Simard | G06F 17/2785 |
| | | | | 704/9 |
| 2015/0379430 | A1* | 12/2015 | Dirac | G06N 20/00 |
| | | | | 706/12 |
| 2016/0239476 | A1* | 8/2016 | Huang | G06F 17/275 |
| 2016/0307067 | A1* | 10/2016 | Filimonova | G06K 9/6202 |
| 2016/0350278 | A1* | 12/2016 | Aharoni | G06F 17/2705 |
| 2017/0053211 | A1* | 2/2017 | Heo | G06N 99/005 |
| 2017/0069310 | A1* | 3/2017 | Hakkani-Tur | G10L 15/063 |
| 2017/0103267 | A1* | 4/2017 | Mishra | G06K 9/00785 |
| 2017/0154281 | A1* | 6/2017 | Ho | G06N 99/005 |
| 2017/0200268 | A1* | 7/2017 | Podilchuk | G06T 7/0012 |
| 2017/0230705 | A1* | 8/2017 | Pardue | H04B 1/3833 |
| 2017/0278514 | A1* | 9/2017 | Mathias | G10L 15/22 |
| 2017/0357521 | A1* | 12/2017 | Paek | G06F 9/4446 |
| 2018/0025726 | A1* | 1/2018 | Gatti de Bayser | G10L 15/22 |
| 2018/0144269 | A1* | 5/2018 | Wilson | G06N 5/022 |
| 2018/0144270 | A1* | 5/2018 | Wilson | G06N 5/022 |

OTHER PUBLICATIONS

Demšar, Janez. "Statistical comparisons of classifiers over multiple data sets." Journal of Machine learning research 7. Jan. 2006, pp. 1-30.*
Wu, Haocheng, et al. "Improving search relevance for short queries in community question answering." Proceedings of the 7th ACM international conference on Web search and data mining. ACM, Feb. 2014, pp. 43-52.*
Liu, Bing, et al. "Joint online spoken language understanding and language modeling with recurrent neural networks." arXiv preprint arXiv:1609.01462, Sep. 2016, pp. 1-9. (Year: 2016).*
List of IBM Patents or Applications Treated as Related.
Anonymous, "System and Method for Reinforced Resource Selection for Conversational Systems," http://ip.com/IPCOM/000249153D; Feb. 8, 2017.
Anonymous, "System and Method to Generate User Profiles Based on Question and Answer Interchange," http://ip.com/IPCOM/000238977D, Sep. 29, 2014.
Anonymous, "Accommodation Modeling for Online Social Networks," http://ip.com/IPCOM/000235982D, Apr. 1, 2014.
Niraula, Nobal B. et al., "A Machine Learning Approach to Anaphora Resolution in Dialogue based Intelligent Tutoring Systems," CICLing 2014, Proceedings of the 15th Intel Conference on Computational Linguistics & Intelligent Text Processing, vol. 8403, pp. 307-318; 2014.
Zadrozny, Bianca et al., "Transforming Classifier Scores into Accurate Multiclass Probability Estimates," Proceedings of the Eighth ACM SIGKDD International Conference on Knowledge Discovery and Data Mining, pp. 594-699; Edmonton, Alberta, Canada, Jul. 23-26, 2002. http://www.research.ibm.com/people/z/zadrozny/kdd2002-Transf.pdf.
High, Rob, "The Era of Cognitive Systems: An Inside Look at IBM Watson and How it Works," IBM Redbooks, 2012.
Yuan, Michael et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Liu, Bing et al, Joint Online Spoken Language Understanding and Language Modeling with Recurrent Neural Networks, arXiv preprint arXiv: 1609.10462, Sep. 2016, pp. 1-9.
Andrea Baraldi, et al. "Quality assessment of classification and cluster maps without ground truth knowledge." IEEE Transactions on Geoscience and Remote Sensing 43.4, Apr. 2005, pp. 857-873.
Haocheng Wu, et al. "Improving search relevance for short queries in community question answering." Proceedings of the 7th ACM international conference on Web search and data mining, ACM, Feb. 2014, pp. 43-52.
Janez Demsar, "Statistical comparisons of classifiers over multiple data sets." Journal of Machine learning research 7, Jan. 2006, pp. 1-30.

* cited by examiner

METHOD, APPARATUS, AND SYSTEM FOR CONFLICT DETECTION AND RESOLUTION FOR COMPETING INTENT CLASSIFIERS IN MODULAR CONVERSATION SYSTEM

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI), application programming interface (API), or other service to the QA system where the questions are processed using artificial intelligence (AI) and natural language processing (NLP) techniques to provide answers with associated evidence and confidence measures from an ingested knowledge base corpus for return to the user(s). For example, the Watson Conversation Service provides a simple, scalable and science-driven front-end service for developers to build powerful chat bots to conduct dialogs to answer questions from end users or consumers, thereby providing improved customer care to the end user. Existing QA systems use one or more machine learning algorithms to learn the specifics of the problem from sample labeled data and help make predictions on unlabeled data by using a "training process" which involves providing the QA system with representative inputs and corresponding outputs so that the QA system will learn by example from pairs of representative inputs/outputs which constitute the "ground truth" for the QA system. In such machine learning systems, a classifier service may employ deep learning technologies to extract intent (outputs) from a natural language utterance (inputs) from training data to learn which utterances map to which intents, thereby providing the ability to extract intent not only from utterances it has seen, but also from any utterance based on similarity of such an utterance to what is available in the training data.

Since intent classifiers are typically limited to an application domain of interest to a client who is building the system using the classifier, this can create challenges when different intent classifiers built for different domains are combined in a conversation system. For example, when individually trained classifiers are combined to compete for an incoming utterance/input with the intent/output results provided to an aggregator algorithm which selects the winning intent according to a pre-set decision rule (e.g., on the basis of the computed confidence measure), there is no guarantee that the application domains covered by each intent classifier are disjoint. When the intents from different classifiers overlap totally or partially, an incoming utterance may receive very similar confidence scores from multiple classifiers having overlapping intents. When this happens, the decision on which classifier should win may become highly unstable and unpredictable, and may be determined more by minor statistical fluctuations of the scores than by genuine differences between the intents. And while there have been some proposals to address potential competition among different classifiers by improving the calibration of confidence scores from different classifiers to make the scores more reliable, there are no existing systems for evaluating independently-trained intent classifiers for overlapping intent definitions, alerting the client of such overlaps, and providing recommended solutions for taking precautions to prevent such overlaps from occurring. Nor are traditional QA systems able to automatically evaluate conflicts between different independently-trained intent classifiers involving multiple sets of potentially overlapping intents without employing simple aggregation procedures where all intents are brought into the same classifier or decision logic, requiring that conflicts be identified through a manual trial-and-error process where a developer or end-users inputs utterances to test a trained classifier, and if the classifier makes an error, the developer manually changes the training data for the classifier or modify the intent set without the benefit of an resolution recommendation. As a result, the existing solutions for efficiently bringing different independently-trained intent classifiers into joint use are extremely difficult at a practical level.

A similar difficulty exists even if the intents from two or more application domains are to be used together in a single classifier, so that they compete for an incoming utterance within the joint classifier. Overlaps in the intent definitions caused by overlaps in the underlying training utterances for a given intent may cause unstable decisions due to noise more than to the true boundary between the competing intents. Being able to detect and correct for this when the joint classifier is designed is highly desirable.

SUMMARY

Broadly speaking, selected embodiments of the present disclosure provide a system, method, and apparatus for designing and building an information handling system for processing inquiries by evaluating multiple, independent training data for overlapping intent definitions between the classifiers and by alerting the client of any intent definition overlap with automated resolution recommendations of precautions to take, such as revising training data, omitting or redefining certain intents that may cause unpredictable outcomes. In selected embodiments where the information handling system embodies a question answering (QA) system which uses multiple intent classifiers jointly, a set of conflict detection methods is provided to determine which pairs of decisions from the classifiers are likely to be in conflict, and if so, produce an alert to the intent classifier designers and offer a procedure for the designer to resolve the conflict. In accordance with selected embodiments, a baseline conflict detection method employs test data suitable for each classifier (i.e., utterances labeled with intents from each classifier but are not used in the training of the respective classifier) and evaluates how likely each classifier is to win over a test utterance that is labeled as belonging to an intent in the other classifier. In the case when no extra test data are available besides those used in training the intent classifiers, the method identifies a subset of the training utterances (e.g., 20%) from each classifier as a test set, uses the remaining training utterances (e.g., 80%) to retrain each respective classifier, and then uses the retrained classifier(s) to assign intent labels to each utterance of the test set, such as by sending classifier decisions to an aggregator which chooses or decides on an intent according to its decision logic. As disclosed herein, the withheld sample size may be adjusted as a function of the total number of utterances (n) in the training data so as to withhold a first percentage (e.g., 40%) of a first group of utterances (e.g., $7 \leq n \leq 50$), to withhold a second percentage (e.g., 30%) of the next group of utterances (e.g., $50 < n \leq 100$), and to withhold a third percentage (e.g., 20%) of any additional utterances (e.g., $n > 100$). By remembering the original intent for each utterance in the test set, the intent decision results from the classifier(s) may be evaluated against the true intent associated with the test utterance to detect and/or report any classification disagreement as classifier errors or confusions. By computing an error rate for a classifier as an estimate of the pairwise confusion between intents that may occur when both classifiers are put to competition, intent pairs with a significant confusion error rate (e.g., exceeding a specified confusion error rate threshold) may be reported to the designer with automated resolution recommendations and advice for reducing the confusion. While the baseline conflict detection method may be applied to treat all competing classifiers symmetrically, a simplified conflict detection method may be applied to detect confusions in one direction only by checking for confusions from intents in a first classifier to intents in a second classifier, but not otherwise checking for confusions from intents in the second classifier to intents in the first classifier. Another simplified conflict detection method which eliminates the need for any aggregator, subsampling and classifier retraining procedures is to apply all training utterances from a first classifier owning intent set {A1, A2, . . . } to a second classifier owning intent set {B1, B2, . . . }, and then record the confusion cases where an utterance the first classifier belong to intent A1 is classified as an intent B1 from the second classifier with a confidence above a pre-set threshold C. While selected embodiments may employ multiple intent classifiers that are used jointly, it will be appreciated that other embodiments may employ a single classifier that is trained using two or more sets of training data, each set comprised of training data for one or more intents. In such embodiments, if test data is available for each of the different training sets, then this test data can be used to detect a confusion error rate between pairs of intents, and then to report to the designer with automated resolution recommendations and advice for reducing the confusion. If such test data is not available, a portion of the training data for each intent on each of the training sets can be sampled so as to be used for test data purposes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
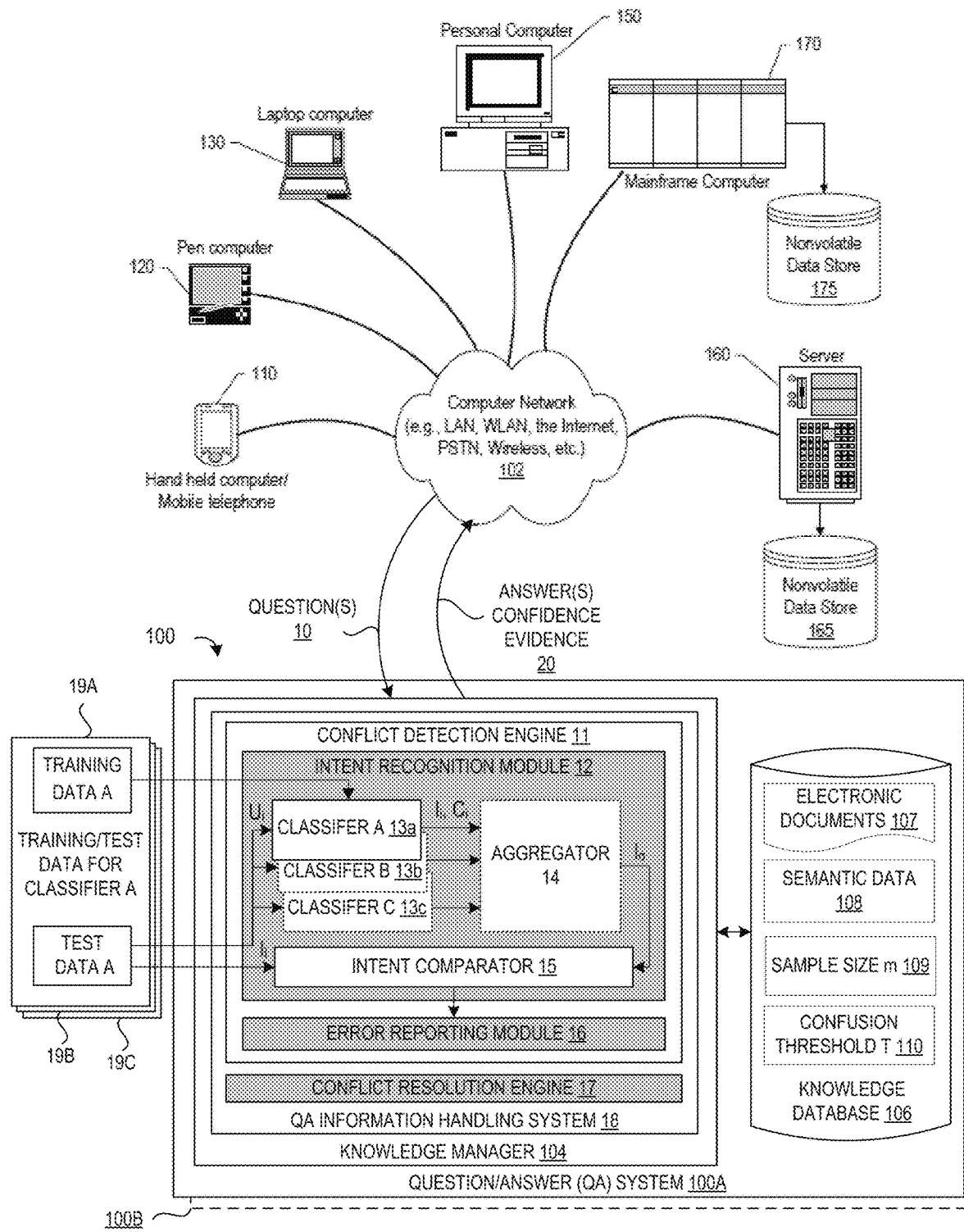
FIG. 1 depicts a network environment that includes a knowledge manager that uses a conflict detection and resolution engine for detecting conflicts between competing intent classifiers and generating conflict resolution recommendations.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102 in which the QA system 100 uses a conflict detection engine 11 for detecting conflicts between competing intent classifiers 13a-b and uses a conflict resolution engine 17 to automatically generate conflict resolution recommendations. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge databases or corpora of electronic documents 106 which stores electronic documents 107, semantic data 108, or other possible sources of data input. In selected embodiments, the knowledge database 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to questions. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in electronic documents 107 for use as part of a corpus of data with knowledge manager 104. Content may also be created and hosted as information in one or more external sources, whether stored as part of the knowledge database 106 or separately from the QA system 100A. Wherever stored, the content may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data.

As further described below, when a process evaluates a given section of a document for semantic content 108, the process can use a variety of conventions to query it from the knowledge manager. One convention is to send a question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter for identifying and processing concept vectors which may aid in the process of answering questions. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

To improve the capability of the QA system 100, a plurality of classifiers 13$a$-$c$ may be combined and used together to assist with the evaluation of questions 10 and generation of answers 20 in response thereto. For example, a first Classifier A 13$a$ may be a core classifier service provided by the Watson Conversation Service (WCS), and a second Classifier B 13$b$ may be a customized Natural Language Classifier (NCL) service which is combined for use with the WCS classifier. As will be appreciated, each classifier (e.g., Classifier A 13$a$) may apply a machine learning algorithm to learn how to answer questions by providing the classifier 13$a$ with training data inputs and corresponding outputs (e.g., Training Data A 19$a$) so that the classifier 13$a$ will learn by example from pairs of representative inputs/outputs which constitute the "ground truth" for the QA system. In similar fashion, different classifiers (e.g., Classifier B 13$b$ and Classifier C 13$c$) are independently trained with separate training data (e.g., Training Data B 19$b$ and Training Data C 19$c$). As a result, each classifier service 13$a$-$c$ may separately apply its own training data to independent extract intent (outputs) from a natural language utterance (inputs) from training data to learn which utterances map to which intents, thereby providing the ability to extract intent not only from utterances it has seen, but also from any utterance based on similarity of such an utterance to what is available in the training data.

To reduce or eliminate the potential confusion that can arise when there is partial or complete overlap in intents from the independently programed classifiers 13$a$-$c$, a conflict detection engine 11 may be included in the QA system 100 for purposes of identifying conflicts between overlapping intents and reporting significant confusion error rates to the designer of the affected classifier. Embodied as part of a QA information handling system 18 in the knowledge manager 104, or as a separate information handling system, the conflict detection engine 11 may include an intent recognition module 12 which is configured to identify conflicting intent decisions from the different classifiers 13$a$-$c$. In addition, the conflict detection engine 11 may include an error reporting module 16 which is configured to track and report instances of confusion between intents from competing classifiers.

As disclosed herein, the intent recognition module 12 may be embodied with a variety of different configurations to identify the conflicting intent decisions as described more fully hereinbelow. At a minimum and as indicated with the solid lined boxes, the intent recognition module 12 includes at least one classifier 13$a$ with an intent comparator 15 to compare actual intent values $I_i$ associated with test utterance data $U_i$ against classifier intent decision outputs $I_o$. In such embodiments, all of the training data (e.g., Training Data A 19$a$, Training Data B 19$b$, and Training Data C 19$c$) are all provided to train the single classifier 13$a$. In other embodiments as indicated with the dashed lines, the intent recognition module 12 includes a plurality of classifiers 13a-c. In such embodiments, the training data for each classifier (e.g., Training Data A 19a, Training Data B 19b, and Training Data C 19c) is provided to train only the corresponding classifier (e.g., Classifier A 13a, Classifier B 13b, and Classifier C 13c), each of which is connected in common to receive utterance test data Ui from each classifier and to generate therefrom intent values Ii and associated confidence measures Ci which are provided to an aggregator 14 which chooses one of the intent values Ii from the classifiers 13a-c as the classifier intent decision outputs Io for comparison at the intent comparator 15 with the actual intent values Ii associated with test utterance data. The aggregator 14 is connected to route an incoming utterances Ui to an appropriate intent handler (such as a dialog, an action, or a text response) according to the decisions by each intent classifier 13a-c and the aggregator's decision logic. An example of the decision logic used by the aggregator 14 is to examine each classifier's confidence Ci on its respective decision Ii, and to use the decision with the highest confidence as the winning intent Io.

In the error reporting module 16, the detected instances of intent confusion may be used to compute an error rate as an estimate of the confusion between intents from two competing classifiers. In selected embodiments, an error report is only generated when there are significant errors detected, such as when the computed error rate exceeds a specified threshold. For example, if the percentage of test utterances belonging to intents from a first classifier get confused as intents from a second classifier, the error reporting module 16 may alert the owners of the classifiers when the confusion rate is above a preset threshold T (for example, T=20%).

To help reduce or eliminate any detected intent confusion arising from completing classifiers 13a-c, the conflict detection engine 11 may also include a conflict resolution engine 17 which is embodied as part of a QA information handling system 18 in the knowledge manager 104, or as a separate information handling system, to provide automated resolution recommendations and advice for reducing the confusion. In selected embodiments, the automated resolution recommendations may include automated features in the error report to enable revisions of the training data. In addition or in the alternative, the automated resolution recommendations may include automated features in the error report to disable, omit or redefine certain intents that may cause unpredictable outcome.

With the disclosed conflict detection and resolution engine 11, 17, independently trained classifiers 13a-c can be used together in a QA system 101, such as a Watson Conversational System, to easily scale up the system's question answering capabilities by providing a validation procedure for detecting potential conflicts during design and testing of the intent classifiers, thereby helping prevent undesirable confusions that may happen after the classifiers are deployed to use. For example, the validation process may be applied to a custom intent classifier (Classifier A) that is being added to a core classifier (Classifier B) by first retrieving the training data used to train the core and custom classifiers. A first portion (e.g., 20%) of the training data utterances (e.g., 19A) for the first or custom classifier is withheld or set aside (e.g., Test Data A), and a second portion (e.g., 80%) of the training data utterances (e.g., Training Data A) is used to train the first/custom classifier (e.g., Classifier A) to create a new temporary (re)trained classifier (e.g., Classifier A). In similar fashion, the training data utterances (e.g., 19B) for the second or core classifier (e.g., Classifier b) is divided into a first portion of withheld test data utterances (e.g., Test Data B) and a second portion of training data utterances (e.g., Training Data B) which are used to train the second/core classifier (e.g., Classifier B) to create a new temporary (re)trained classifier. In dividing each training data set into first and second portions, the number of intents is the same in each portion, but there are fewer utterances in the first portion for the test data. In addition, the original or true intent for each utterance in the withheld test data utterances is stored or remembered for subsequent processing.

Once the retraining of each classifier is finished, each test utterance from the withheld test data (e.g., Test Data A) for the custom classifier (Classifier A) is sent to both retrained classifiers under test (e.g., Classifier A and Classifier B), and the responses are processed by the aggregator 14 which selects the winning classifier using the aggregator's decision logic. This same process may be repeated in the reverse direction by sending test utterance from the withheld test data (e.g., Test Data B) for the core classifier (Classifier B) to both retrained classifiers to generate responses that are processed by the aggregator 14 to select the winning classifier. An example of the decision logic used by the aggregator is to examine each classifier's confidence Ci on its decision Ii, and to select the decision with the highest confidence as the winning intent Io.

In an alternative implementation of the intent recognition module 12 when additional test data are available for each classifier besides the training data, the retraining step can be omitted and the test data from either classifier are sent to both classifiers for decision.

Another alternative implementation of the intent recognition module 12 has the training data from multiple classifiers combined to retrain a new joint classifier with all sets of intents, and the test data are sent to the joint classifier which outputs a single intent decision according to its decision model. If no separate test data are available, the training data from the two classifiers are divided into subsets for testing and training for the joint classifier.

At the intent comparator 15, the actual classification (winning intent) is recorded for each test data utterance and then compared to the original or true intent corresponding to the test utterance to compute a total count for how many of test utterances were actually classified to the wrong intent (belonging to the other classifier). If a threshold number (e.g., at least 2 or 20%, whichever is greater) of the intent test utterances are wrong, the error reporting module 16 provides a notification of a conflict to the designer of the conflicting classifier.

In addition or in the alternative, the notification to the designer may include one or more recommendations for resolving the detected conflicts that are automatically generated by the conflict resolution engine 17. In a first example resolution recommendation, the notification report may include an automated button or actuable command for disabling or turning off one or more intents from the conflicting classifier (e.g., the core classifier). With this solution, the custom classifier is assumed to cover all of the utterances of the disabled intent. In a second example resolution recommendation, the notification report may include an automated button or actuable command for modifying the intents and utterances of the conflicting classifier (e.g., the custom classifier). With this solution, the user can add or remove intents and add or remove intent utterances. While removing a single utterance may not change much, the addition of utterances should help to make the intent classification more specific, thereby reducing the conflict ratio. In a third example resolution recommendation, the notification report may include an automated button or actuable command for adding counter examples to the conflicting classifier (e.g., the custom classifier). In a fourth example resolution recommendation, the notification report may include an automated button or actuable command for merging intents by combining training data from competing classifiers.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include a pen or tablet computer 120, laptop or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems.

Figure 2:
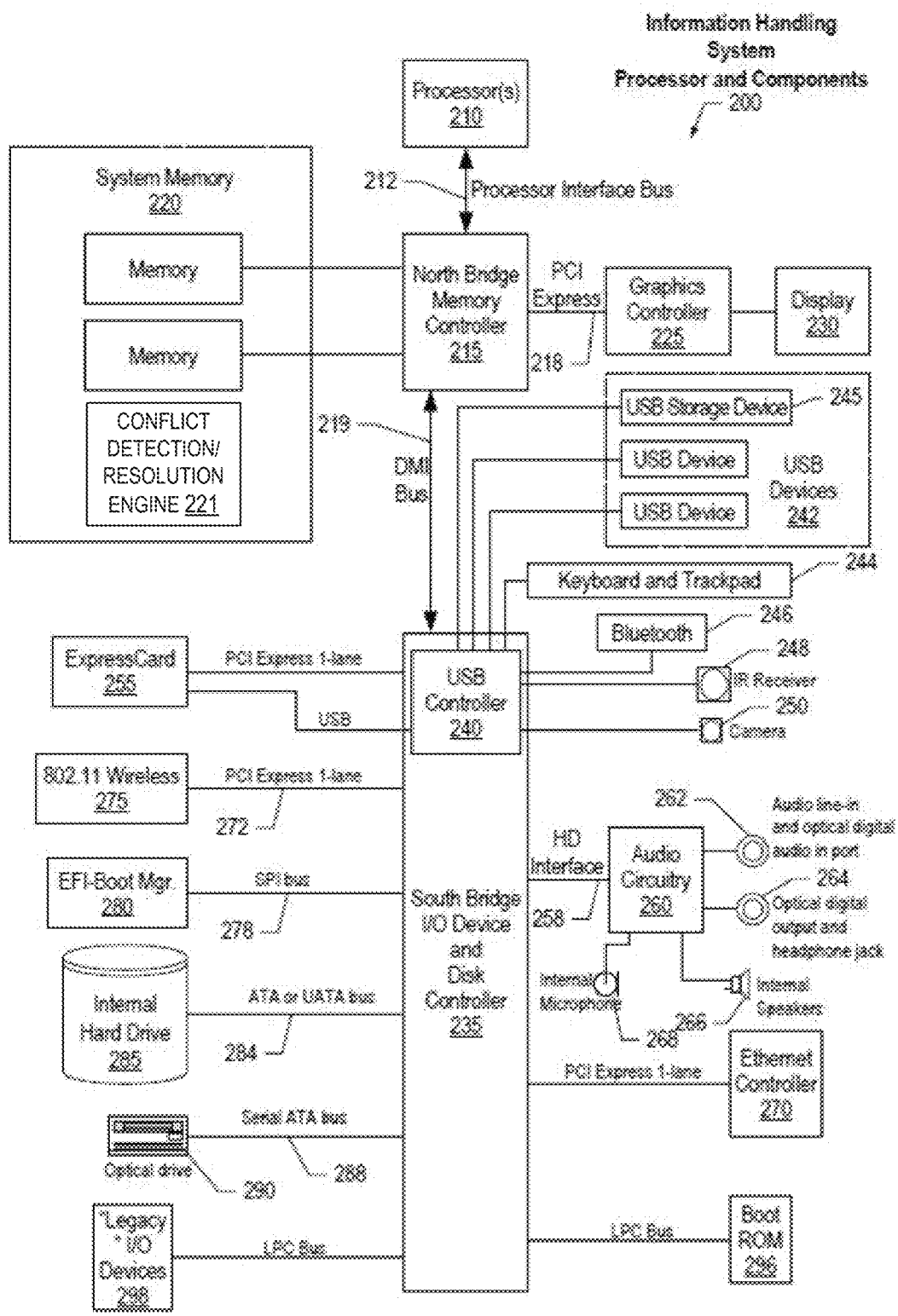
FIG. 2 is a block diagram of a processor and components of an information handling system such as those shown in FIG. 1.

FIG. 2 illustrates an illustrative example of an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a conflict detection and resolution engine module 221 which may be invoked to evaluate independently trained intent classifiers for overlapping intent definitions and to alert the client of any intent definition overlap with automated resolution recommendations of precautions to take to prevent or reduce conflicts. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) and the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one example configuration for an information handling system 200, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
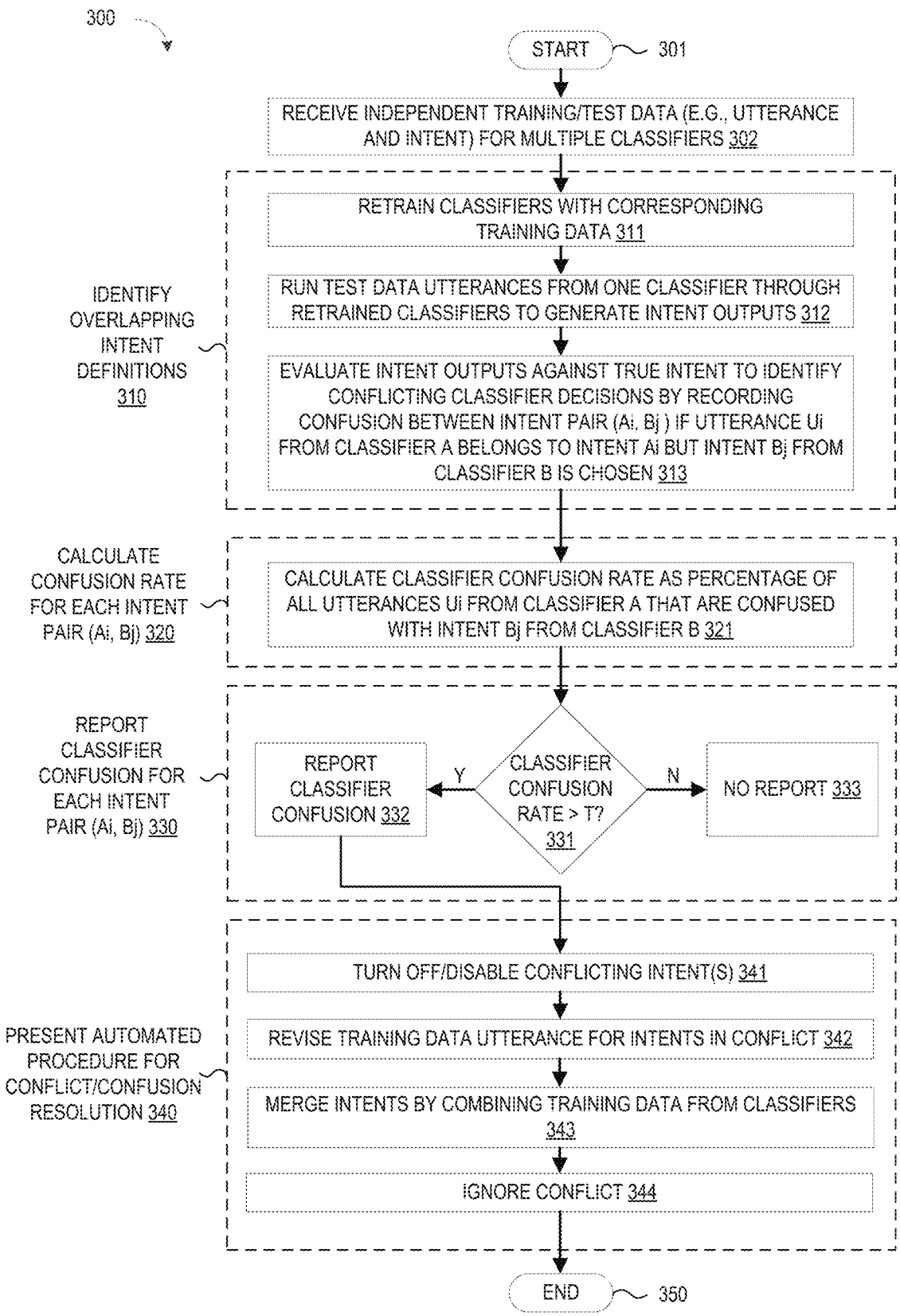
FIG. 3 illustrates a simplified flow chart showing the logic for detecting and resolving overlapping intent definitions from competing intent classifiers.

To provide additional details for an improved understanding of selected embodiments of the present disclosure, reference is now made to FIG. 3 which depicts a simplified flow chart 300 showing the logic for detecting and resolving overlapping intent definitions from competing intent classifiers. The processing shown in FIG. 3 may be performed in whole or in part by a cognitive system, such as the QA information handing system 18, QA system 100, or other natural language question answering system which uses multiple natural language classifier services that are independently trained in different application domains and jointly used to compete for incoming utterances when classifying the intent of a user query.

FIG. 3 processing commences at 301 which may occur during design and/or test time when developers submit intent classifiers for inclusion in a conversation system. At this point, the method steps 310, 320, 330, 340 embody the functionality of a design tool that evaluates the submitted classifiers against any one that they would compete with, such as a default classifier included in the conversational system. As explained below, the evaluation tool checks for any potential conflicts between the classifiers using one or more conflict detection methods described as follows.

At step 302, training and test data is received or derived for each of the submitted classifiers. In selected embodiments, independent sets of training and test data may be received for each classifier under test in the form of "utterance" inputs and "intent" outputs which are divided or split into a "training data" portion and a "test data" portion for each classifier. For example, a first set of training data (Training Data A) and a set of test data (Test Data A) may be received for a first classifier (Classifier A) that is independent from a second set of training data (Training Data B) and a set of test data (Test Data B) that is received for a second classifier (Classifier B). In other embodiments, the processing at step 302 may access the training utterances for competing classifiers A and B which respectively own intent sets, and then divide the training utterances from each classifier randomly into two subsample sets including a training data set and test data set. In an example embodiment, where Classifier A having a total number of n utterances, m randomly selected utterances may be picked for the test data set, where 0≤m≤n test utterances from this set. In another embodiment, a subsample size for the test data may be determined as a simple percentage (e.g., 20% of the training utterances) so that consist of 80% of the training utterances are allocated as training data and 20% of the training utterances are allocated as test data, though any arbitrary split may be used. In another example embodiment, the subsample size for the test data may be adjusted as a function of the total number of utterances (n) in the training data so as to withhold at least one randomly selected utterance (e.g., 1 utterance) once a threshold number of utterances (e.g., n=6) is reached, to withhold a first percentage (e.g., 40%) for a successive first group of utterances (e.g., 7≤n≤50), to withhold a second percentage (e.g., 30%) for the next group of utterances (e.g., 50<n≤100), and to withhold a third percentage (e.g., 20%) for any additional utterances (e.g., n>100). When choosing the number of withheld test utterances m as a function of the total number of utterances n, the number obtained from the percentile calculation may be rounded down. Furthermore, because a classifier requires at least 5 utterances in order to train, then m=0 for the first few values of n. Stated equationally, the sample size m for different intent data size n may be expressed as:

$$m = \begin{cases} 0 & \text{if } 0 \leq n \leq 5 \\ 1 & \text{if } n = 6 \\ \lfloor 0.4 \cdot n \rfloor & \text{if } 7 \leq n \leq 50 \\ 20 + \lfloor 0.3 \cdot (n-50) \rfloor & \text{if } 50 < n \leq 100 \\ 35 + \lfloor 0.2 \cdot (n-100) \rfloor & \text{if } n > 100. \end{cases}$$

Generally speaking, the number of withheld test utterances m may range from 20% to 50% of the utterances. In yet other embodiments, the processing at step 302 may independently derive the training and test data sets for each classifier by first defining the intents (a.k.a., classes or categories) to be extracted from natural language utterances, collecting end-user utterances that are to be mapped to the defined intents, assigning or mapping the collected utterances to the defined intents or to an "other" (or "offtopic") intent, and then randomly dividing the utterances into two sets, a training set and a test set. A 70% training and 30% test is a typical split.

Using the received test data utterances for at least one of the intent classifiers, overlapping intent definitions with competing classifiers are identified at step 310. The identification of overlapping intents at step 310 may be performed at the QA system 100 or conflict detection engine 11 by employing NLP processing and/or extraction algorithms and/or machine learning techniques to implement one or more conflict detection methods for identifying which pairs of decisions from the classifiers are likely to be in conflict. As will be appreciated, one or more processing steps may be employed to identify overlapping intent definitions.

For example, the identity overlap processing at step 310 may employ training data subsamples to retrain the respective classifiers at step 311. For example, a first classifier A (e.g., a customized NLC classifier) may be retrained using the 80% training data subsample from Classifier A 19A so that the training set (Training Data A) would constitute the "ground truth" for the retrained classifier A. Likewise, a second classifier B (e.g., an intents classifier in the Watson Conversation Service) is retrained using the 80% training data subsample from Classifier B 19B. As disclosed herein, the classifier retraining processing at step 311 may be performed at the QA system 100 or intent recognition module 12 by employing one or more machine learning algorithms to learn from representative utterance inputs and corresponding intent outputs which constitute the "ground truth" for learning how utterances map to defined intents.

Once training of the competing classifiers is complete, the identity overlap processing at step 310 may run test data utterances from each classifier through the competing classifiers to generate intent outputs from each classifier at step 312. As disclosed herein, the processing of test data utterances at step 312 may be performed at the QA system 100 or intent recognition module 12 by sending each utterance $U_i$ from the 20% test data subsample (e.g., Test Data A) through the competing classifiers (e.g., Classifiers A and B) to generate respective intent decisions $I_i$ and corresponding confidence measures $C_i$ which may then be evaluated by an aggregator that chooses the winning intent decision $I_o$ according to its decision logic.

As disclosed herein, the processing at step 312 may be applied symmetrically to each of the competing classifiers as part of a baseline method for detecting confusions in both directions between competing classifiers. Alternatively, the processing at step 312 may be applied asymmetrically to one classifier as part of a simplified method for detecting confusions in one direction between competing classifiers. For example, the processing at step 312 may check for confusions between intents Ai of a first classifier A to intents Bj of a second classifier B for all pairs (i,j), but not check for intent confusions from Bi to Aj for any pair (i,j). In the cases where Classifier A is fixed (e.g., with a specific instance of the Watson Conversation Service) but Classifier B may change for each client (e.g., with a custom classifier), this simplification involves only one subsampling and retraining procedure to make Classifier A', and uses Classifier B as is, and can therefore speed up the process of validating Classifier B at its time of introduction to the system.

Once intent outputs from the retrained classifiers are generated in response to the input test utterances, the identity overlap processing at step 310 may evaluate, for each input test utterance, the intent outputs against the true intents corresponding to the input test utterances to identify conflicting classifier decisions at step 313. As disclosed herein, the evaluation of intent outputs against true intents at step 313 may be performed at the QA system 100 or intent comparator module 15 by storing the original intent Ii for each utterance Ui in the test set, and then comparing the true intent Ii to the chosen intent Io. If the evaluation processing at step 313 determines that the test utterance Ui belongs to true intent Ai from Classifier A, but the chosen intent Io is an intent Bj from Classifier B, there is no match, and the comparison outcome is recorded as a confusion between the intent pair (Ai, Bj).

In selected embodiments, the identification of conflicting classifier decisions at step 313 may be calculated symmetrically to detect two-way confusion between each pair of classifiers under test. However, one way to simplify the process for identifying overlapping intents at step 313 is to detect one-way confusion from Classifier A to Classifier B in either direction, if not in both directions. For example, by checking for confusions from Ai to Bj for all pairs (i,j) but not confusions from Bi to Aj for any pair (i,j), the processing at step 313 is simplified for better efficiency, if not reduced accuracy. Example applications for such one-way confusion detection includes cases where Classifier A is fixed, but Classifier B may change for each client, in which case there is only one subsampling of training utterances and retraining procedure to make Classifier A', and the Classifier B may be used as is, and can therefore speed up the process of validating Classifier B at its time of introduction to the system.

Another way to simplify the process for identifying overlapping intents at step 313 is to omit the use of the aggregator and all subsampling and classifier retraining procedures. In such embodiments, Classifier B is used for all training utterances from Classifier A, and all confusion cases are recorded where an utterance from intent Ai is classified by Classifier B as intent Bj with a confidence above a pre-set threshold C. If the percentage of confusion for the intent pair (Ai, Bj) is above the pre-set threshold T, that pair is reported as in conflict. In similar fashion, the process can be performed in another direction, i.e., by taking training utterances from Classifier B, applying them to Classifier A, and reporting all cases where an utterance from intent Bi is decided to be Aj with a confidence above a pre-set threshold C. The percentage of such cases gives an estimate for the chance of confusion for the intent pair (Bi, Aj).

As will be appreciated, any desired combination of the baseline method and/or simplified methods can be used to implement the conflict detection procedure at step 313 that covers a range of tradeoffs in the quality of the conflict results and the speed of the detection process. In addition, the methods disclosed herein can be generalized to detect conflicts between more than two intent classifiers by treating each pair of classifiers with the proposed procedures.

After identifying overlapping intent definitions at step 310, a confusion rate may be calculated for each intent pair (Ai, Bj) at step 320. The confusion rate calculation at step 320 may be performed at the QA system 100 or conflict detection engine 11 (e.g., the intent comparator module 15 or error reporting module 16) by employing computational and memory resources to calculate, for at least one classifier, the confusion rate for one or more defined intents in the classifier. As will be appreciated, one or more processing steps may be employed to calculate the confusion rate. For example, a classifier confusion rate calculation step 321 may access the recorded intent pair confusion data to calculate a classifier confusion rate as percentage of all utterances Ui from classifier A that belong to intent Ai but are confused with intent Bj from classifier B. The percentage of all utterances belonging to Ai that get confused as Bj is taken as a measure of how much intent Ai is in conflict with Bj when both classifiers A, B are put to competition.

Once the confusion or error rate is calculated at step 320, classifier confusion may be reported to the classifier designer at step 330. As disclosed herein, the reporting of classifier confusion at step 330 may be performed at the QA system 100 or conflict detection engine 11 (e.g., error reporting module 16) by employing computational and memory resources to compute for at least one classifier the confusion rate for one or more defined intents in the classifier. In selected embodiments, the reporting at step 330 may identify only intent pairs having a significant confusion error rate by using a confusion threshold detection step 331. While the confusion threshold T may be set to any desired value, a confusion threshold percentage T=20% may be set for evaluating intent A from Classifier A as being confused with intent B from Classifier B by letting k denote the number of test utterances of A that were classified as B resulting in one-way confusion from A to B, and if k>0.2*m and k≥2, then the two intents are said to be conflicting because the confusion exceeds the confusion threshold T=0.2. If the calculated classifier confusion rate for a confused intent pair exceeds the defined confusion error rate threshold (e.g., T=20%) (affirmative outcome to detection step 331), then a report is sent to the classifier designer at step 332. However, if the calculated classifier confusion rate does not meet the confusion error rate threshold (negative outcome to detection step 331), then no report is issued (step 333).

To account for the variability in the quality of the confusion probability estimates due to the training data and subsamples having vastly different sizes, the test for an error rate passing the pre-set threshold T at step 330 can be implemented with a statistical hypothesis testing framework. To this end, a confidence interval [L, H] may be computed from the error rate p (which is the count of errors over the total number of samples in the intent) by subtracting and adding a margin of error according to an assumed distribution. For example, with sufficiently large sample size n for an intent, if $np \geq 10$ and $n(1-p) \geq 10$, then the margin of error $e=Z*\text{sqrt}(p(1-p)/n)$, where $Z=1.96$ provides a 95% confidence interval. With this computed confident interval, the detection step 331 may conclude that no conflict exists only if the higher error interval H<T.

In other embodiments, a calibration procedure may be added to incorporate the confidence scores from different classifiers so that they better resemble probability measures and hence are more comparable. In addition or in the alternative, weights or other adjustments may be added to upgrade or downgrade the scores from classifiers of a certain type. Such adjustments may be added to the aggregator if one is used, or independent of the aggregator if it is omitted.

In selected embodiments, the classifier confusion report may also include a presentation of one or more automated procedures for recommending one or more resolutions for reducing or eliminating detected intent conflict or confusion at step 340. As disclosed herein, the confusion resolution recommendations presented at step 340 may be generated by the QA system 100 or conflict resolution engine 17 by employing the information handling system 18 to generate and insert automated links into the confusion report to facilitate resolution of detected classifier conflicts. As will be appreciated, one or more processing steps may be employed to present automated conflict resolutions. For example, an automated resolution recommendation (step 341) may provide an automated link or mechanism for disabling, omitting, or redefining certain intents that may cause unpredictable outcome. In addition or in the alternative, an automated resolution recommendation (step 342) may provide an automated link or mechanism for revising the training data utterance or intents in conflicting classifiers. In addition or in the alternative, an automated resolution recommendation (step 343) may provide an automated link or mechanism for merging intents by combining training data from competing classifiers. In addition or in the alternative, an automated resolution recommendation (step 345) may provide an automated link or mechanism for ignoring conflicts.

The disclosed methodology 300 for detecting and resolving overlapping intent definitions from competing intent classifiers may advantageously be implemented to support the design and testing of a modular conversational system that supports the joint use of multiple intent classifiers that are developed and trained independently. By implementing the disclosed conflict detection methods in a tool for building and configuring modular conversational systems, a conflict detection tool and procedure are provided for receiving intent classifiers that may be developed by different clients, content vendors, or the conversational system's own developers, and then detecting and reporting conflicts between any grouping of the available classifiers that a client wishes to employ. Depending on the detection methodology, the identified conflicts maybe one-sided or two-sided. Once the conflict report is produced, the tool may present a set of options to the client for resolving the conflict. Such resolution options may depend on the type of overlap between the intents, and may include, but are not limited to merging some intents by combining the training data from the classifiers, turning off certain intents, and/or revising the training data so the intents will not conflict with one another. In this way, the results of the conflict detection and resolution method are aggregated and presented by the system. To understand what type of utterances to remove, the system presents which utterances in the test data were wrongly classified and what confidence each decision has. Once the conflicts between competing classifiers are resolved, an incoming end-user utterance may be routed to each classifier along with decision logic to select which classifier's intent decision to adopt in order to prevent classier confusion.

To illustrate additional details of selected embodiments of the present disclosure, reference is now made to FIGS. 4-7 which illustrate a sequence of example user interface display screen shots used in connection with validation process for detecting overlapping capabilities between competing "core" and "custom" intent classifiers. In the first user interface display screen 400 shown in FIG. 4, two tabs 401, 402 display capabilities for the "Core Capabilities" and "Custom Capabilities," respectively. When selected, the "Custom Capabilities" tab 402 displays to the end user a matrix of custom capabilities or defined intents (e.g., about_VA, capabilities, compound_questions, decision_replies, goodbyes, greetings, improving_system, interface_interactions, intervace_issues, locate_amenity, navigation, negative_reaction) that have been added to the virtual agent. Each displayed custom capability (e.g., 410) identifies the defined intent (e.g., locate_amenity 411) and provides a user-actuable link or button (e.g., 412) for providing user access to the underlying training data for the associated capability.

The first user interface display screen 400 also includes a first user-actuable confusion report link 403 which displays an indication of how many conflicting capabilities or intents have been detected (e.g., "13 conflicts found") using the automated conflict detection process of the present disclosure. To the extent that the automated conflict detection process can be invoked at various times (e.g., whenever the custom capabilities are linked to the virtual agent, whenever the Custom Capabilities tab 402 is opened, whenever the training data underlying the custom capabilities changes, or even on-demand by clicking on the validation update button 405), the first user-actuable confusion report link 403 is continuously updated to reflect the number of conflicting intents. When actuated or selected by the user (e.g., through cursor interaction 407), the first user-actuable confusion report link 403 opens a report on the conflicting intents, as described more fully below with reference to FIG. 5.

As part of the automated conflict resolution functionality disclosed herein, the first user interface display screen 400 may also include a second user-actuable training data access link 404 with identifying labeling (e.g., "View workspace details . . . ") that allows the user to view and apply changes to the training behind the displayed custom capabilities. When actuated or selected by the user (e.g., through cursor interaction), the second user-actuable training data access link 404 opens a listing of all intents or capabilities for the custom classifier where the user can scroll through to view and apply changes to the training behind the custom capabilities. In addition or in the alternative, each displayed custom capability (e.g., 410) may include a user-actuable link (e.g., 411) or button (e.g., 412) which may be actuated or selected by the user (e.g., through cursor interaction 408) to view and apply changes to the training behind the selected custom capability, as described more fully below with reference to FIG. 6.

In further support of the automated conflict resolution functionality disclosed herein, the first user interface display screen 400 may include an additional user-actuable link 406 with identifying labeling (e.g., "Remove Custom Capabilities . . . ") that allows the user to disable all core-conflicting intents from the custom classifier. As used herein, a "disable" function effectively turns "OFF" the selected intent(s), in contrast to a "delete" function which removes the intent(s) so that it cannot be turned "ON" again. Though the additional user-actuable link 406 could be configured to disable only the conflicting intents, user decision-making regarding conflict resolution may instead be directed to the report on the conflicting intents, as described hereinbelow with reference to FIG. 5.

As indicated above, user actuation of the first user-actuable confusion report link 403 prompts the system to display a confusion report of conflicting intents. An example confusion report is shown in the second user interface display screen 500 depicted in FIG. 5 wherein a report window or pane 501. To this end, the report window 501 presents the user with instructions 502 for reviewing and resolving conflicts which may include links to open additional windows or user-actuated functionality. The report window 501 may also display information identifying the capabilities or intents 510, 520, 530, 540 from the "core" classifier which conflict with capabilities or intents 512, 522, 532 from the "custom" classifier. Stated more generally, the report window 501 lists each core capability for which a conflict has been found (e.g., Account_Management-Account_Number_Inquiry 510), the custom capability (e.g., locate_amenity 512) that it conflicts with, and a description (e.g., 513) of how significant the overlap is (e.g., "32% of Account_Management-Account_Number_inquiry utterances could mistakenly be answered by locate_amenity"). In the depicted example, the report window 501 lists additional core capabilities (e.g., Help-Ending 520, Help-Greetings 530, Help-Help 540, etc.) along with the corresponding conflicting custom capabilities (e.g., goodbyes 522, greetings 532, etc.) and associated description of the quantitative overlap.

In addition to displaying the detected conflicts between custom and core capabilities, the report window 501 in the second user interface display screen 500 may also include one or more conflict resolution recommendation links or buttons which are automatically generated and displayed to assist the classifier designer with resolving the conflicting capabilities or intents by turning off, deleting, and/or retraining the core and/or custom capability that is in conflict. To this end, an "on/off" button or link 519, 529, 539, 549 may be displayed for each conflicting core capability 510, 520, 530, 540 to turn "OFF" or disable the corresponding core capability. In addition or in the alternative, an "on/off" button or link 514, 524, 534 may be displayed for each conflicting custom capability 512, 522, 532 to turn "OFF" or disable the corresponding custom capability. In addition or in the alternative, a "trash" button or link 515, 525, 535 may be displayed for each conflicting custom capability 512, 522, 532 to delete or remove the corresponding custom capability. In addition or in the alternative, each identified custom capability 512, 522, 532 may be configured as a user-actuable training data access links 512, 522, 532 for accessing the underlying training data so that the user may view and modify the associated training data to eliminate the conflict.

Figures 6, 7:
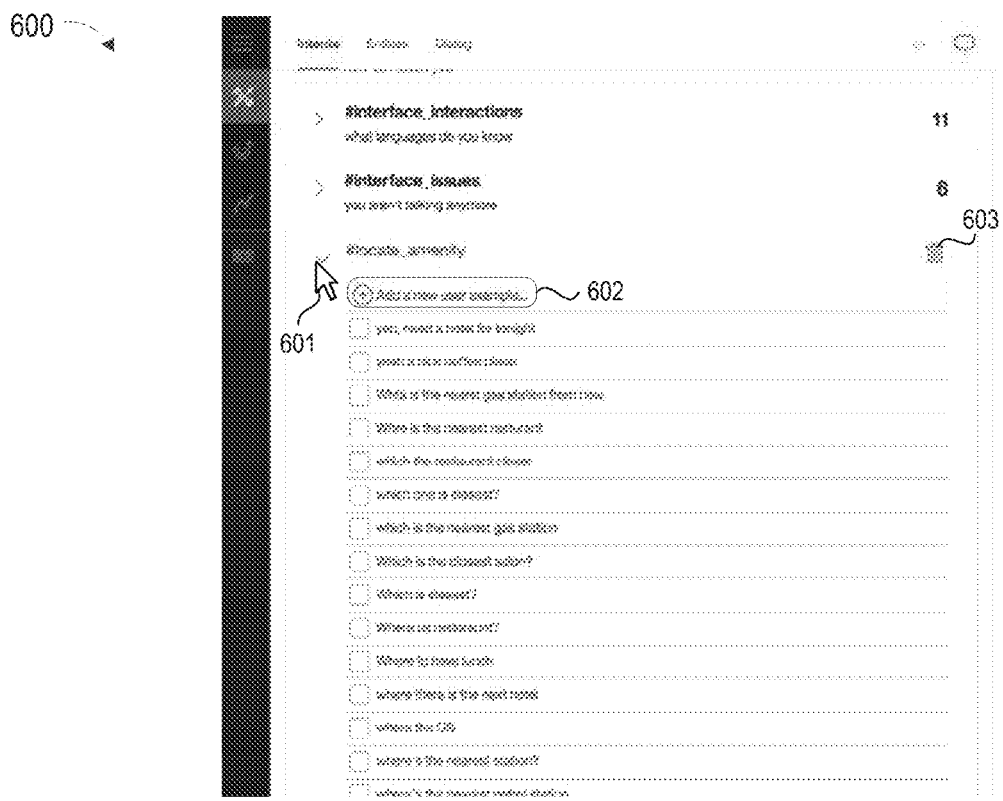

In selected embodiments, actuation of the training data access links 512, 522, 532 through cursor interaction 503 will allow a user to view the underlying training data and apply changes thereto for purposes of resolving the conflicts. For example, FIG. 6 provides an example of a third user interface display screen 600 which is opened upon actuation of the training data access link 512 for the "locate_amenity" intent to allow the user to view the training of the custom capabilities directly, so that detailed editing of the training data can be done. As depicted, user interaction with the dropdown menu using the cursor 601 causes the third user interface display screen 600 to display training data utterances for the defined intent (e.g., locate_amenity). The training data for each depicted custom capability may be edited by adding new user examples using the "add" button 602 having appropriate labeling (e.g., "Add a new user example"). In addition or in the alternative, the depicted training data may be edited by deleting user examples using the cursor 601 to select or "tick" boxes next to each example being deleted and then clicking the "trash" icon 603 to remove the selected examples.

Figure 4:
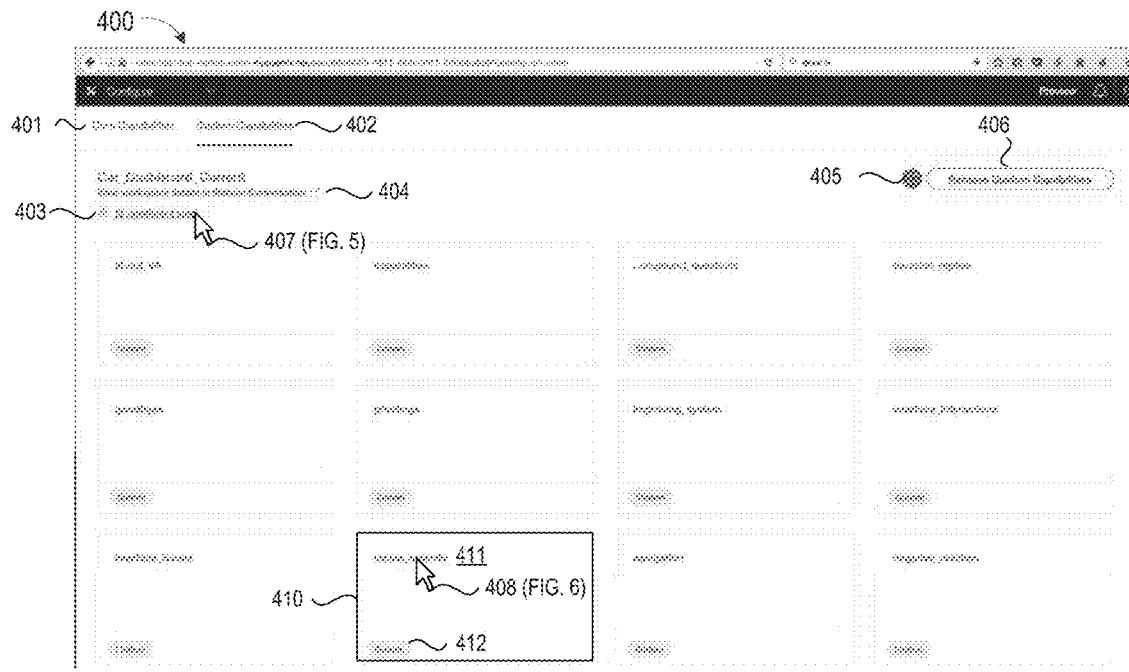
FIGS. 4-7 illustrate an example sequence of user interface display screen shots from a validation process that may be used to detect and resolve overlapping capabilities between competing intent classifiers.
Figure 5:
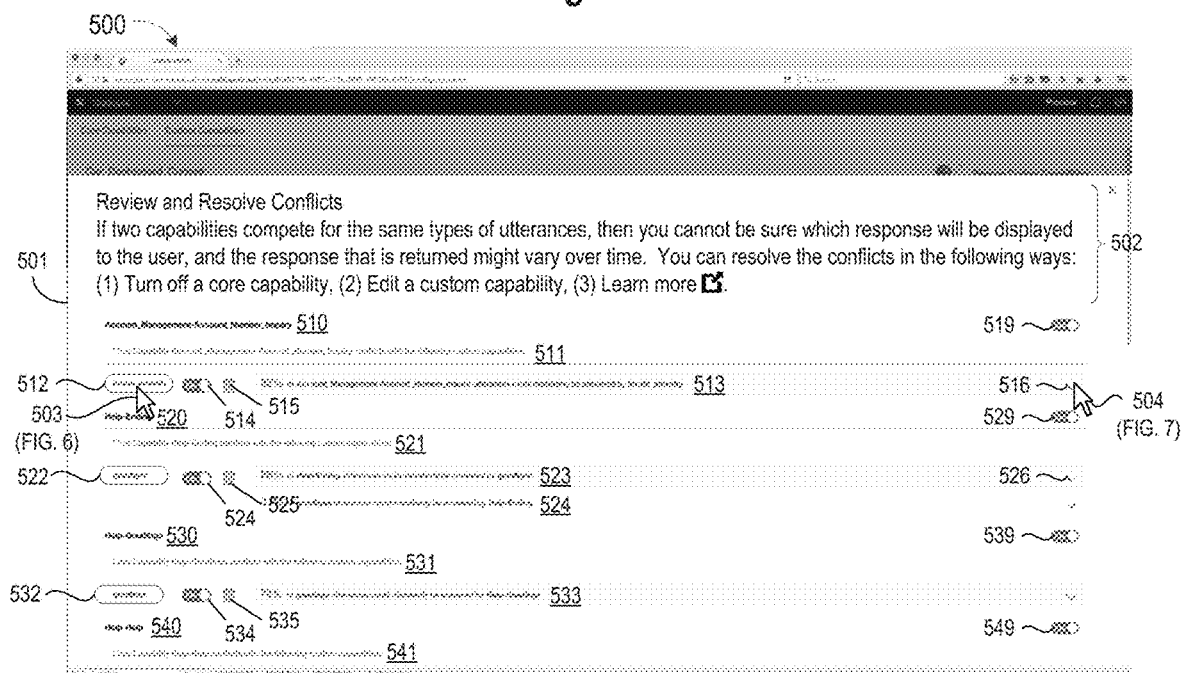

Referring back to the user interface display screen shots shown in FIGS. 4-7, the disclosed method and apparatus may be employed by a designer to validate custom capabilities being added to existing core capabilities. In such situations, custom capabilities can easily be defined with intents that are similar in behavior to existing core capabilities, leading to intent confusion outcomes where the core and custom intent classifiers are competing to respond to certain user queries so that there is uncertainty about which capability will ultimately respond, resulting in inconsistent agent behavior. By using the conflict detection and resolution build tool to perform a validation run, the designer can check for overlapping capabilities between competing "core" and "custom" intent classifiers, and be provided with recommended solutions for resolving any conflicts before publishing the agent. As illustrated in FIG. 4, the initial validation run may be started by clicking the validation update button 405 to initiate a process for comparing example utterances from the training data for capabilities of each type (e.g., "core" and "custom") to look for duplication by taking a random sample of the training utterances to compare against competing classifiers to find potential conflicts. If conflicts are found, user actuation of the confusion report link 403 will generate a conflict report (e.g., 501) in which conflicting capabilities (e.g., core capability 510 and custom capability 512) are displayed along with a quantitative description of the conflict (e.g., 511) (FIG. 5). In addition, an additional report (e.g., 701) may be displayed which lists the example utterances that are most likely to be misdirected along with an indication of the likelihood (as a percentage) that the two will conflict with one another (FIG. 7). Each of the conflict reports 501, 701 may also include one or more conflict resolution recommendation mechanisms that are automatically generated and displayed so that the end user can turn off, delete and/or retrain the underlying capability that is in conflict. As will be appreciated, the conflict detection and resolution process may require multiple conflict resolution actions to resolve all conflicts, and the ability to resolve conflicts will depend on whether the user of the tool has access to all or only a portion of the training data.

To provide additional details for an improved understanding of the present disclosure, consider a scenario where a third party vendor (e.g., IBM) has provided an intent classifier with "core capabilities" where the majority of the training data for these core capabilities are hidden and where there is only a limited mechanism for "turning off" a core capability. In this scenario, an end user who is adding an intent classifier with "custom capabilities" is assumed to have full access to the training data for the "custom capabilities," but only limited access to the "core capabilities."

With only limited access to the "core capabilities," the end user may be provided with conflict resolution recommendations which allow the end user to "turn off" a conflicting core capability, but which do not include deleting or retraining the core capability. For example, in the conflict report example of FIG. 5, the "on/off" button or link 519 provides a first conflict resolution recommendation to enable the end user to switch "OFF" the core capability (e.g., Account- _Management-Account_Number_Inquiry 510), effectively eliminating that particular conflict. Once the core capability is disabled by switching the toggle 519 to "OFF," the end user can close the report page 501 and then click the validation update button 405 to confirm that the conflict was addressed.

On the other hand, the ability of the end user to fully access the training data for the custom capabilities means that more resolution techniques can be applied with respect to conflicting custom capabilities. For example, in the conflict report example of FIG. 5, the "on/off" button or link 514 provides the end user with the ability to reversibly switch "OFF" the custom capability (e.g., locate_amenity 512), effectively eliminating that particular conflict. In addition or in the alternative, the "trash" button or link 515 provides the end user with the ability to delete the custom capability (e.g., locate_amenity 512), permanently eliminating that particular conflict. In addition or in the alternative, the training data access link 512 provides the end user with the ability to view the training of the custom capabilities directly (FIG. 6) so that detailed editing of training data for the custom capabilities can be done by the end user. In addition or in the alternative, the drop-down menu button 516 provides the end user with the ability to display an additional report (e.g., 701) showing a list of utterances within the core capability that would be classified incorrectly (FIG. 7). In selected embodiments, the additional report (e.g., 701) may include one or more buttons (e.g., 703) which may be selected by the user through cursor interaction (702) to mark the utterances as "irrelevant" within the custom capabilities. The act of marking them as irrelevant has the effect of adding them to the training data of the custom capabilities as examples of things that are "irrelevant" so that they do not trigger any capability within the custom capabilities.

By now, it will be appreciated that there is disclosed herein a system, method, apparatus, and computer program product for generating detecting and resolving conflicts between two or more training data sets with an information handling system having a processor and a memory. A data structure known as a workspace may be used to contain a classifier and the training utterances for each intent the classifier decides on. As disclosed, the system, method, apparatus, and computer program product retrieves first and second independent training data sets, each including a plurality of intents and end-user utterances for use in training one or more classifiers to recognize a corresponding intent from one or more of the end-user utterances. In selected embodiments, the retrieved training data sets are divided into a training data portion and a test data portion by identifying one or more end-user utterances from a predetermined percentage of each training data set to serve as the test data portion, and identifying all remaining end-user utterances to serve as the training data portion. Using the training data sets, one or more classifiers are trained. Once (re)training of the classifier(s) is complete, the system provides a first test end-user utterance associated with a first intent from the first independent training data set to the one or more classifiers to select an output intent generated by the one or more classifiers. The system also identifies a first conflict when the first intent does not match the output intent. In selected embodiments, the first conflict may be identified by displaying a report listing of each output intent from a first classifier for which a conflict has been found, the first intent from a second competing classifier, and a description of numerical overlap between the output intent and the first intent. In other embodiments, the report listing may be displayed only when the numerical overlap exceeds a specified reporting threshold value. Finally, the system automatically generates one or more conflict resolution recommendations for display and selection by an end user to resolve the first conflict. The conflict resolution recommendations may be generated by displaying a user-actuable mechanism for deleting one or more of a first plurality of intents, for turning off one or more of a second plurality of intents, and/or for viewing and modifying the training data associated with the first intent or output intent to resolve the first conflict. In selected embodiments, the classifiers may be a single statistical classifier that is trained with the first and second independent training data sets to recognize an intent from each end-user utterance. In other embodiments, the classifiers are embodied as first and second classifiers which are separately trained, respectively, by end-user utterances from, respectively, the first and second independent training data sets for processing by an aggregator to select the output intent. In such embodiments, the output intent is selected from the first and second intents generated by the first test end-user utterance based on comparing first and second confidence values calculated by the first and second classifiers for first and second intents.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for resolving training data conflicts, the method comprising:

retrieving, by the system, first and second independent training data sets corresponding, respectively, to first and second independently trained classifiers, each training data set comprising a plurality of intents and end-user utterances for use in training one or more classifiers to recognize a corresponding intent from one or more of the end-user utterances;

training, by the system, the one or more classifiers using the first and second independent data sets;

providing, by the system, a first end-user utterance test data associated with a first intent set to the one or more classifiers to select an output intent generated by the one or more classifiers;

identifying, by the system, a first conflict when the first intent associated with the first end-user utterance test data does not match the output intent; and automatically generating, by the system, one or more conflict resolution recommendations for display and selection by an end user to resolve the first conflict by displaying a user-actuable mechanism for turning off and not deleting one or more of the plurality of intents to resolve the first conflict.

2. The method of claim 1, where the one or more classifiers comprises a single statistical classifier that is trained with the first and second independent training data sets to recognize an intent from each end-user utterance.

3. The method of claim 1, where the one or more classifiers comprises first and second classifiers which are separately trained, respectively, by end-user utterances from, respectively, the first and second independent training data sets for processing by an aggregator to select the output intent.

4. The method of claim 3, where the output intent is selected from first and second intents generated by the first end-user utterance test data based on comparing first and second confidence values respectively calculated by the first and second classifiers for the first and second intents which are generated, respectively, by the first and second classifiers.

5. The method of claim 1, further comprising dividing each of the first and second independent training data sets into a training data portion and a test data portion by identifying one or more end-user utterances from a predetermined percentage of each training data set to serve as the test data portion, and identifying all remaining end-user utterances of each training data set to serve as the training data portion.

6. The method of claim 1, where automatically generating one or more conflict resolution recommendations comprises displaying a user-actuable mechanism for turning off one or more of a plurality of intents to resolve the first conflict.

7. The method of claim 1, where automatically generating one or more conflict resolution recommendations comprises displaying a user-actuable mechanism for viewing and modifying the training data set associated with the first intent or output intent to resolve the first conflict.

8. The method of claim 1, where identifying the first conflict between the first and second competing classifiers comprises displaying a report listing of each output intent from a first classifier for which a conflict has been found, a first intent from a second competing classifier, and a description of numerical overlap between each output intent and the first intent from the second competing classifier.

9. The method of claim 8, where identifying the first conflict comprises displaying the report listing only when the numerical overlap exceeds a specified reporting threshold value.

* * * * *